United States Patent [19]

Markos

[11] Patent Number: 4,939,764

[45] Date of Patent: Jul. 3, 1990

[54] SPOT FILM APPARATUS AND METHOD OF OPERATING SAME

[75] Inventor: Mark A. Markos, Schiller Park, Ill.

[73] Assignee: Fischer Imaging Corporation, Denver, Colo.

[21] Appl. No.: 126,544

[22] Filed: Nov. 30, 1987

[51] Int. Cl.⁵ .............................................. G03B 42/02
[52] U.S. Cl. .................................. 378/181; 378/175
[58] Field of Search .................... 378/98, 99, 173–177, 378/181

[56] References Cited

U.S. PATENT DOCUMENTS

| | | | |
|---|---|---|---|
| 4,249,079 | 2/1981 | Thomas | 378/176 |
| 4,380,333 | 4/1983 | Turner | 378/181 |
| 4,539,696 | 9/1985 | Walling et al. | 378/181 |

OTHER PUBLICATIONS

"The C Programming Language", by Brian W. Kernighan and Dennis M. Ritchie, Prentice-Hall, Inc., 1978.

Primary Examiner—Craig E. Church
Assistant Examiner—John C. Freeman
Attorney, Agent, or Firm—Willian Brinks Olds Hofer Gilson & Lione

[57] ABSTRACT

Spot film apparatus which includes a menu-driven microprocessor for producing control signals to position a film cassette as required to carry out operations in a manner shown on a display. The spot film apparatus includes an improved carriage assembly which comprises a pair of opposing holding arms which conform with the film cassette. The opposing holding arms are biased towards each other with a helical spring. Loading of a cassette into the arms is accomplished by moving one arm with a continuous chain drive which supports a pawl-like member projecting therefrom, while maintaining the position of the second arm.

2 Claims, 8 Drawing Sheets

SPOT FILM APPARATUS AND METHOD OF OPERATING SAME

CROSS-REFERENCE TO RELATED APPLICATIONS

"Improved Spot Film Apparatus and Method of Operating Same", Ser. No. 126,813, filed Nov. 30, 1987, Inventors Frank C. Scribano et al.;

"Improved Spot Film Apparatus and Method of Operating Same", Ser. No. 126,543, filed Nov. 30, 1987, Inventors Janusz M. Zbrzezniak et al.;

"Improved Spot Film Apparatus and Method of Operating Same", Ser. No. 127,026, filed Nov. 30, 1987, Inventors Frederick T. Budelman, Jr. et al.;

"Improved Spot Film Apparatus and Method of Operating Same", Ser. No. 127,025, filed Nov. 30, 1987, Inventor Frederick T. Budelman, Jr.; and "Spot Film Apparatus", Ser. No. 127,009, filed Nov. 30, 1987, Inventor Frederick T. Budelman, Jr. et al.

BACKGROUND OF THE INVENTION

This invention pertains generally to radiography and particularly to X-ray spot film apparatus and method of operating same.

It is known in the art of diagnostic X-ray equipment that many different modes of operation are desirable. For example, it may be desirable, inter alia, to change: (a) the size of the photographic film; (b) the number of images on any given photographic film; (c) the positioning of images on any given photographic film. In the past, different modes of operation have been called up by actuating selected sets of switches in a matrix of switches to provide appropriate control signals for each different mode of operation. Unfortunately, the number of switches required in the matrix to provide the appropriate control signals is relatively large. As a result, then, difficulty is encountered in finding room on known spot film apparatus for mounting the matrix of switches. Still further, it will be recognized that the number of different modes of operation is limited by the number of switches in the largest possible matrix of switches.

In order to determine the particular mode of operation that has been selected in any known spot film apparatus, the matrix of switches (or associated indicator lights) must be inspected. When the number of switches in the matrix is large, the probability of error in the setting of individual switches, or in observing associated indicator lights, becomes unacceptably high. An additional problem with so many switches is that the process of setting the switches might be very lengthy. In a medical facility with many doctors, each doctor might require different switch settings. Thus, the operator of an X-ray equipment in such an environment wastes appreciable amounts of time changing the switch settings to meet different requirements.

It is known to use stepping motors in spot film apparatus to provide the motive source for the positioning of elements (such as a film cassette or a mask) within such apparatus. Unfortunately, however, known types of control circuitry include resistors that may, on occasion, dissipate large amounts of heat. Such dissipation obviously is deleterious to proper operation.

It is known to arrange spot film apparatus so that more than one exposure may be made on the film in each cassette. To accomplish such exposures, it is necessary to provide for properly loading the cassette and moving the cassette into the correct position for each exposure. Further, it is necessary to provide an adjustable mask to reduce fogging of the film due to stray radiation. The known mechanisms for accomplishing the foregoing are complicated and susceptible to failure.

SUMMARY OF THE INVENTION

With the foregoing background of the invention in mind, it is an object of this invention to provide improved spot film apparatus wherein many different modes of operation are effected under the control of a menu-driven microprocessor.

Another object of this invention is to provide improved spot film apparatus wherein an appropriate human readable visual display of the status of the spot film apparatus is provided.

Another object of this invention is to provide a method for operating spot film apparatus whereby the number of modes of operation of such apparatus may be increased almost without limit.

Still another object of this invention is to provide a simplified mechanism for more accurately positioning a cassette and for adjusting a mask in spot film apparatus.

The foregoing and other objects of this invention are attained generally by providing spot film apparatus wherein: (a) a menu-driven microprocessor is operated to produce appropriate control signals for a selected mode of operation; (b) a display is provided showing, in human readable form, the selected mode of operation and the status of the apparatus; (c) actuating means, including a plurality of stepper motors (with each having its own driver responsive to control signals out of the menu-driven microprocessor) are operated in response to the control signals to provide motive power for positioning of a film cassette and a mask; (d) motion translating means, including appropriate non-slip belts driven by the stepper motors, ultimately move the film cassette and the mask into a proper position as required; and (e) a cassette loading mechanism is provided to ensure that the initial position of any cassette is correct.

The contemplated method generally comprises the steps of: (a) loading, aligning and transporting a cassette to a known initial position relative to an X-ray beam; (b) then producing a first set of signals indicative of the size of the cassette; (c) producing, in response to a selection from a menu, a second set of signals indicative of a desired mode of operation; (d) applying the first and second set of signals to a processor to produce appropriate control signals for application to both a display (to show, in human readable form, a description of the desired mode of operation) and to a plurality of movable components of the spot film device (here including stepper motors and drive belts) to move the cassette and the mask as required for execution of the desired operation; and, (e) after execution of the desired operation, producing control signals to change the display to indicate such execution and to move the cassette to a position to execute the next desired operation.

BRIEF DESCRIPTION OF THE DRAWINGS

For a more complete understanding of this invention reference is now made to the following description of the accompanying drawings in which:

Referring now to FIGS. 1 and 1A, it may be seen that the spot film apparatus 10 here contemplated is mounted in any convenient manner on a column 12. A table 14 is also mounted on the column 12. A source of X-rays (not shown) is disposed within the table 14. The column 12 and the table 14 (along with the source of X-rays) are conventional and not essential to an understanding of this invention but are shown to indicate the relationship of the spot film apparatus 10 to a diagnostic X-ray machine.

Figure 1:
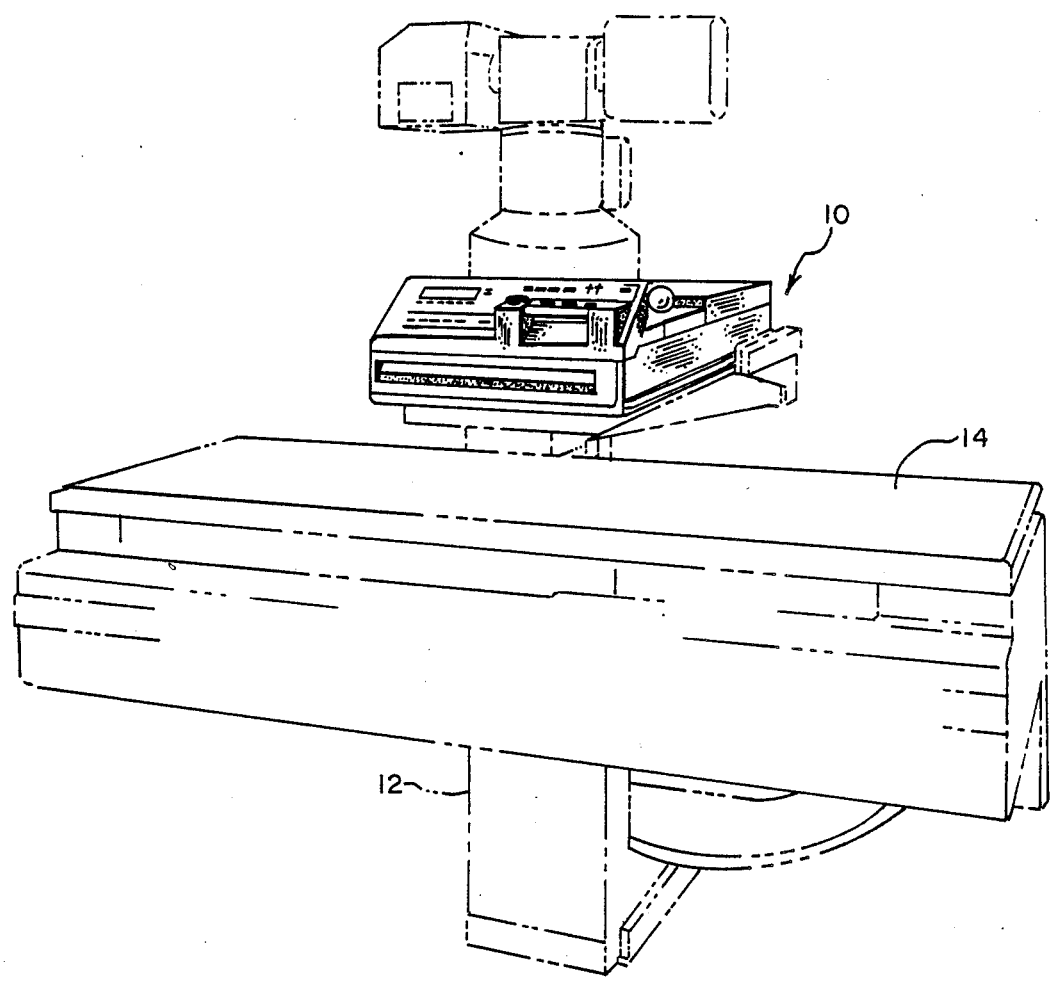
FIGS. 1 and 1A are simplified sketches of spot film apparatus according to this invention.
Figure 1A:
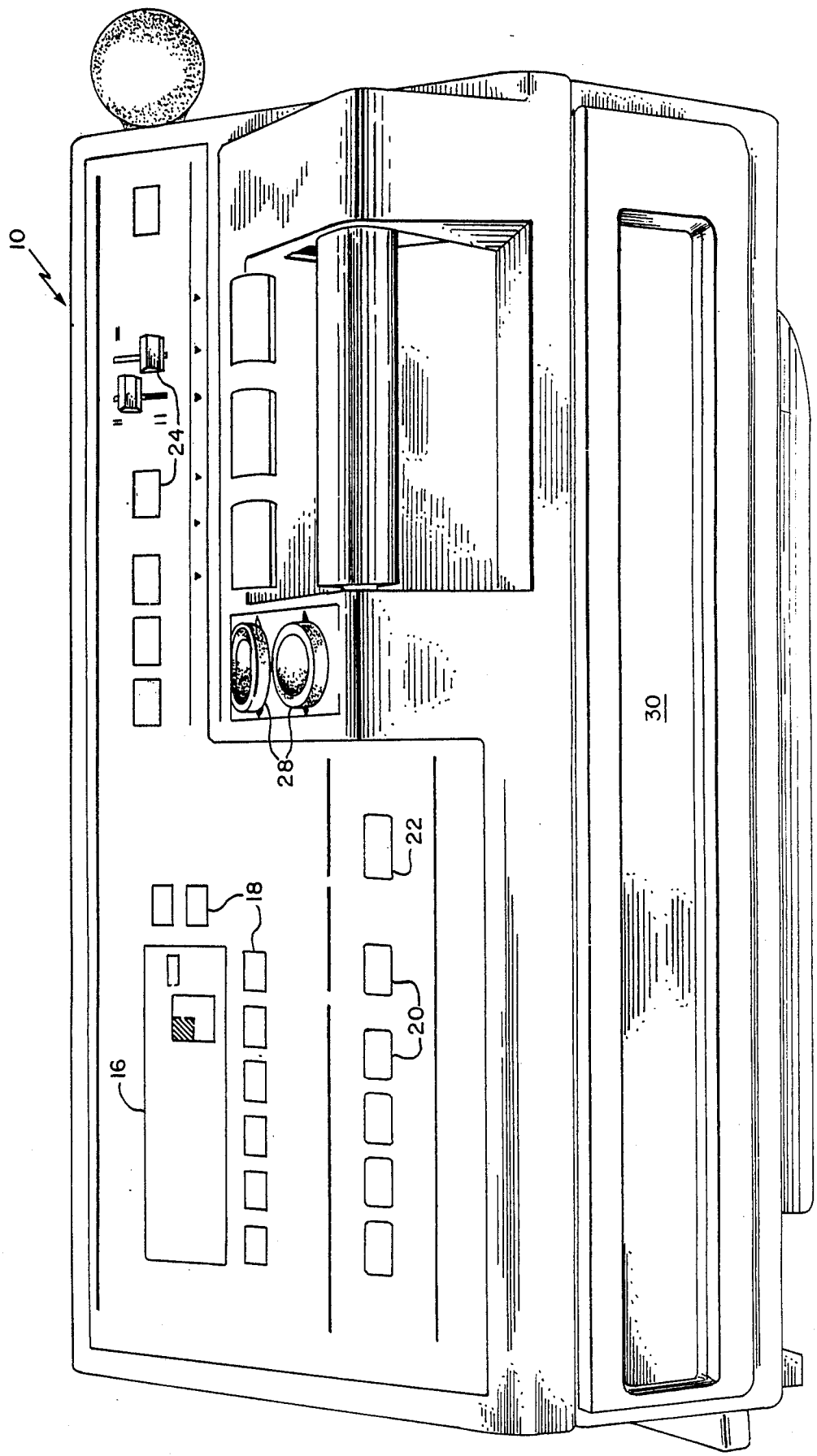

The front panel (not numbered) of spot film apparatus 10 is divided generally into four quadrants. A display 16, here a liquid crystal display (LCD), and associated first set of control switches (such as the switches designated by the numerals 18) are disposed in one quadrant. A second set of switches (such as the switches designated by the numerals 20, 22) are disposed in a second quadrant to provide control signals for locking the spot film apparatus 10 and the table 14 to the column 12 and for loading or unloading film cassettes (not here shown). A third set of switches (such as the switches designated by the numeral 24) are disposed in a third quadrant to provide control signals for the source of X-rays (not shown) or fluoroscope apparatus (shown generally on the column 12). A fourth set of switches (such as the switches designated by the numeral 26) are disposed in the fourth quadrant along with adjustment knobs 28 for exposing film (not here shown) to the source of X-rays and moving the table 14. Finally, a cassette access slot 30 for loading and unloading a cassette (not here shown) is provided generally across the bottom of the front panel (not numbered).

It will be appreciated as the description of the invention proceeds that switches in the second, third and fourth sets of switches are needed to perform known operations for almost all types of diagnostic X-ray equipment. Therefore, a description of the switches in the second, third and fourth quadrants and the circuitry in which such switches are incorporated is not here necessary. A description of the circuitry associated with the first set of switches and of the display 16 follows in connection with the remaining FIGURES. Suffice it to say here that the display 16 is actuated to present in human readable form, menus from which desired modes of operation may be selected and executed.

System Block Diagram

Figure 2:
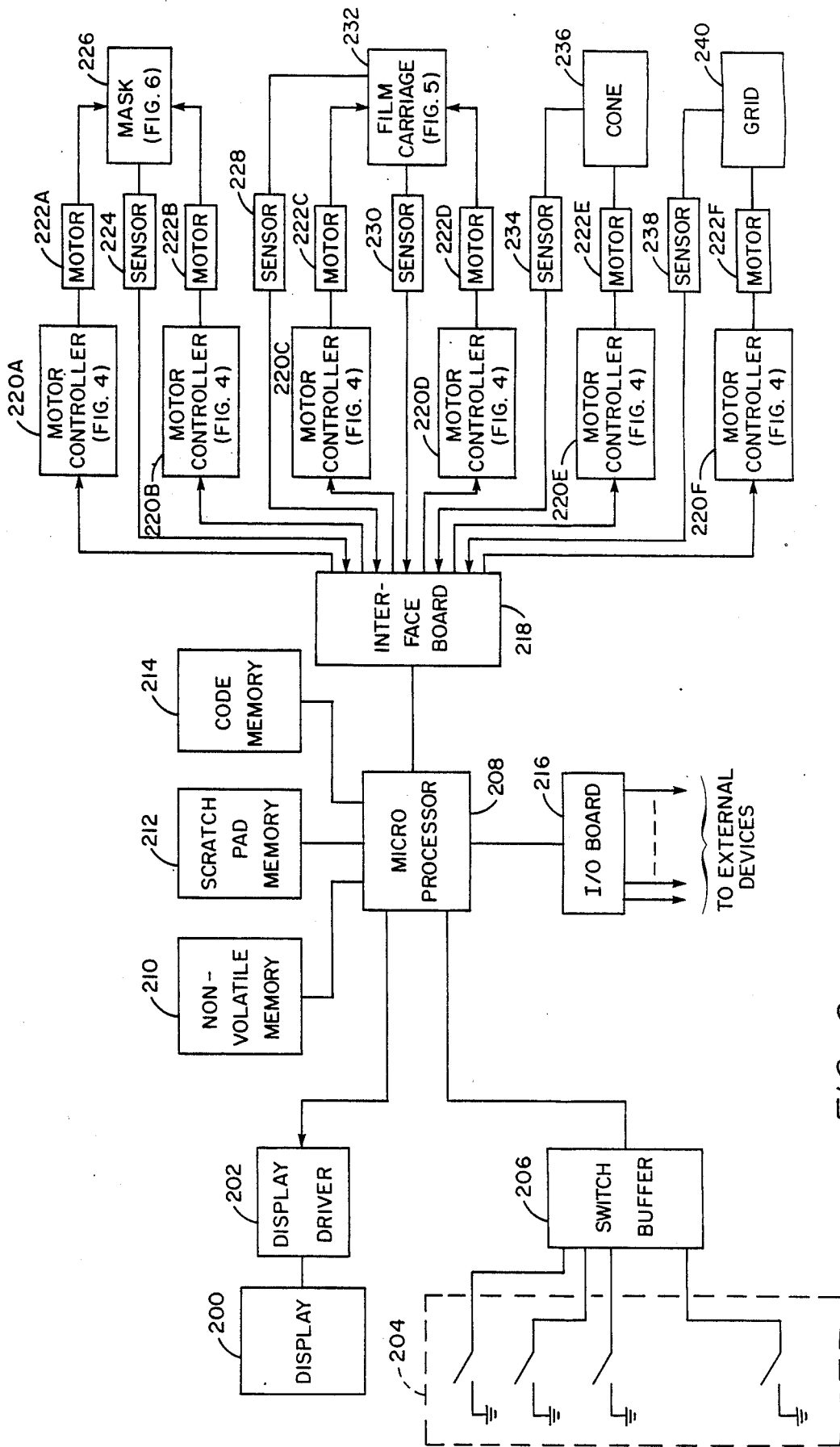
FIG. 2 is a block diagram, greatly simplified, showing the interconnection of the major elements of the contemplated system.

Before referring to FIG. 2, it will be noted that necessary but standard elements of any electronic circuitry that includes a microprocessor—such as power sources and timing signals—are not explicitly shown.

Microprocessor 208 executes software to control the operation of the various components of the system, the particular software executed being selected by a human operator depressing a selected one, or ones, of the switches 204. Thus, execution of selected software by the microprocessor 208 controls the information on the display 200 and the motion of the mask 226, film carriage 232, cone 236 and grid 240. Here, microprocessor 208 is part number 68008, or equal, manufactured by Motorola Corp., Phoenix, Ariz. It will be noted that elements often referred to as "support components" are provided with the microprocessor 208. For example, capacitor filters connected to the power supply (not shown), an address decoder and external interrupt controller such as a "PAL," part number PAL16L8, manufactured by Monolithic Memories of California are provided.

Each one of the switches 204 is connected to microprocessor 208 via switch buffer 206, here a 74HCT240 tristate buffer. Switch buffer 206 detects when any of the switches 204 is depressed and then operates in a known manner to pass a predetermined digital word, depending upon which one of the switches 204 is depressed. Microprocessor 208 reads the digital word and responds, in a manner described in greater detail below, according to which switch was depressed.

A display 200, here an LCD display such as part number F2624 from Seike of Japan, is fed by a display driver 202 that in turn is fed by the microprocessor 208. The digital words describe the information desired to appear on display 200 to show a menu and to indicate the status of the apparatus.

Microprocessor 208 has access to three types of memory: non-volatile memory 210, scratch pad memory 212 and code memory 214. Code memory 214 here is a 32k×8 programmable read only memory (PROM) which contains all possible instructions that may be executed by microprocessor 208. Scratch pad memory 212 contains information needed during execution of any instruction by microprocessor 208. Non-volatile memory 210 is constructed from an 8k×8 Electrically Erasable Programmable Read Only Memory (EEPROM) such as part number 28C64 from General Instrument of California.

Interface board 218 is also connected to microprocessor 208. Interface board 218 contains digital latches for each of the six motor controllers 220A through 220F. The operation of motor controllers 220A through 220F is described in more detail below in conjunction with FIG. 4. Suffice it to say here, however, that the digital words described by the states of the latches are commands to the motor controllers 220A through 220F. The commands cause motor controllers 220A through 220F to generate signals which make motors 222A through 222F, respectively, turn as desired.

The motors 222A through 222F are stepper motors. Here, motors such as part number 34D-9109 or 23D-6108 from Rapidsyn Division of American Precision Industries were used. As is known, the shaft of a stepper motor rotates a predetermined number of degrees in response to the appropriate signals. Thus, by writing words to the latches on interface board 218, the microprocessor causes one of the motors 222A through 222F to rotate a desired number of degrees.

As is shown in FIG. 2, adjustment of the opening in mask 226 is effected by motors 222A and 222B. Mask 226 is described in greater detail below in conjunction with FIG. 6. Suffice it to say here that the elements of the mask 226 come together so as to form a rectangular opening defining the field of exposure on the photographic film. The elements of mask 226 are moved by motor 222A to define the length dimension of the rectangular opening. The elements of mask 226 are moved by motor 222B to define the width of the rectangular opening. The movements are such that the center of the rectangular opening remains fixed.

Sensor 224 senses a "home" or reference position of the mask elements. Sensor 224 produces a logical high (HI) signal when the mask elements are closed. When the mask elements are not closed, sensor 224 produces a logical low (LO) signal. The output of sensor 224 runs to interface board 218. Microprocessor 208 can read a word from interface board 218 which tells if the output of sensor 224 is HI or LO, i.e., if the mask 226 is closed. The ability to know the position of the mask elements with certainty at some time is very important in accurately positioning the mask 226. Thus, commands are passed from microprocessor 208 to motor controllers 220A and 220B to close mask 226 to the reference position as indicated by the output of sensor 224. From such a starting point the microprocessor 208 then computes the number of motor steps needed to move the elements in the mask to form any desired opening. Without knowing the starting location of the mask elements, the microprocessor 208 could not compute the number of motor steps needed to attain any desired opening.

Film carriage 232 is positioned by motors 222C and 222D. Suffice it to say here that film carriage 232 holds a film cassette and positions it for exposure by the X-ray source. Motor 222C moves the film carriage back and forth along the length of the spot film device. Motor 222D moves the carriage from side to side along the width of the table.

The film carriage 232 has position sensors associated with it. The sensors are described in more detail in conjunction with FIG. 5. Suffice it to say here, however, that sensors 228 and 230 produce signals indicating when the carriage is in a predetermined reference position. Those signals go to interface board 218 where they can be read by microprocessor 208. The signals produced by sensors 228 and 230 also indicate the size of the film cassette in the film carriage 232.

Motor 222E moves a cone in and out of a beam. A cone is a standard piece of a spot film device and is not discussed further herein. Sensor 234 indicates when cone 236 is in a reference position.

Motor 222F moves grid 240 in and out of an X-ray beam. A grid is a standard piece of a spot film device and is not discussed further herein. Sensor 238 indicates when grid 240 is in a reference position.

I/O board 216 is also connected to microprocessor 208. I/O board 216 contains numerous electronic switches which can be connected to external devices. Microprocessor 208 writes digital words to I/O board 216 which can open and close the switches. Those switches turn on and off or connect and disconnect external devices. For example, an X-ray generator might be connected to the spot film device. Those switches could turn on the X-ray generator to produce an image on a viewing screen.

Controlling Software

Figure 3:
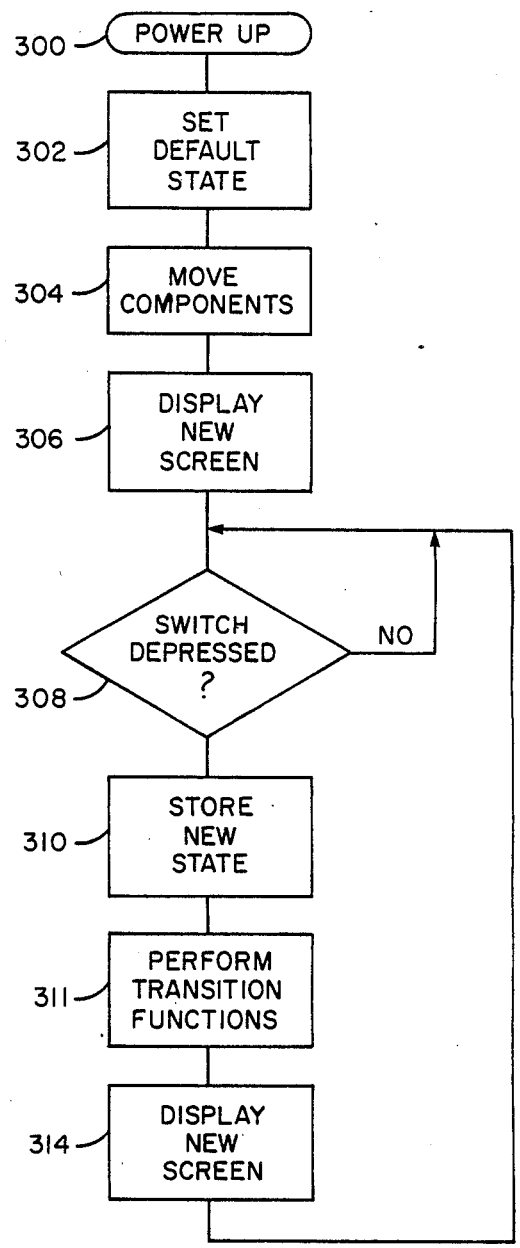
FIG. 3 is a flow chart showing the operation of the processor here contemplated.

FIG. 3 shows a diagram of the flow of execution of the software controlling the spot film device. The diagram shows the major functions to be performed by the software. One skilled in the art will understand that functions depicted in FIG. 3 can be implemented many different ways using software. Here, C language source code is used. The source code is cross-compiled to produce object code. The object code is further processed using standard methods to produce an executable image which is stored in code memory 214 (FIG. 2).

The software depicted in FIG. 3 implements what is sometimes called a "state machine". When the software is being developed, every possible operating state of the spot film device is identified. Each state is characterized by the response of the spot film device to the various inputs. Here, inputs are the positions of switches 204 (FIG. 2).

In each state, a "menu" appears on the display. (The menus in the various states are generally different, but some states have the same menus.) A human operator seeing a menu can obtain information about some aspect of the spot film device. For instance, one menu might show which regions of the piece of film loaded in the device have already been exposed. Additionally, the menu contains a limited number of choices for the human operator to effect operation of the device. Information on the display also indicates which of the switches on the device should be depressed to make those choices. For instance, in one state the menu might provide choices to be used when calibrating the position of grid 240 (FIG. 2). The menu contains an indication of which switches to press to cause the device to perform the various functions associated with calibrating the grid position.

Once all the states are defined, a state number is assigned to each. A data structure is then defined which has one composite entry for each state. The composite entry in the data structure for each state is called a "state descriptor." Each state descriptor is comprised of groups of bits representing a particular type of information. Each group of bits is called a "field." The information in the various fields describes how the spot film device should respond when certain of the switches 204 (FIG. 2) are depressed. All the state descriptors are stored in code memory 214 (FIG. 2).

A second data structure is defined to describe the information which appears on display 200 (FIG. 2). The data structure has one composite entry called a "menu descriptor" for each menu. Each menu descriptor is comprised of fields describing the information which should appear on various parts of display 200 (FIG. 2) to make a menu.

Turning now to FIG. 3, the use of state descriptors and menu descriptors is more clearly shown. When power is first applied to the spot film device, program execution begins at point 300. Processing block 302 selects a state number. The state number selected by processing block 302 is the default state because the spot film device always goes to that state at power-up. Processing block 304 generates commands to the motor controllers 220A through 220F (FIG. 2) to put the components in their predetermined starting positions.

Processing block 306 reads from the menu descriptor corresponding to the menu displayed after power-up. Processing block 306 then computes and sends to display driver 202 (FIG. 2) the commands needed to cause the required display. It should be understood that the information displayed on the screen for any given menu might be predetermined. Every time the spot film device displays such a menu, exactly the same information is seen on the display. However, the information displayed might be variable. In those instances, a field in the menu descriptor contains information about where in memory the information to appear on display 200 (FIG. 2) is located.

Decision block 308 checks if one of the switches 204 (FIG. 2) is depressed. When a switch is depressed, execution continues at processing block 310.

Processing block 310 determines the state to which the spot film device should go. This new state is determined from information stored as part of the state descriptor for each state. There is an entry in the state descriptor corresponding to each of the switches 204 (FIG. 2). That entry contains the state number of the new state. Thus, processing block 310 determines which of the switches 204 (FIG. 2) was depressed and reads from the state descriptor the number of the new state.

The state descriptor also contains entries identifying functions which should be performed as part of the state transition. These transition functions potentially include any functions which can be accomplished by the microprocessor 208 (FIG. 2) sending commands to any of the devices shown in FIG. 2 connected to the microprocessor. Each of the functions is implemented as a computer software subprogram. Thus, the state descriptor table also contains entries for each of the switches 204 (FIG. 2) describing the subprogram executed when that key is depressed. Processing block 311 reads those identifiers from the state description table and invokes the appropriate subprogram. For example, the transition from one state to another state might require the storage of data in non-volatile memory 210 (FIG. 2). During that transition, processing block 311 would call a subprogram which stores the appropriate data in the appropriate location in memory. Other transition functions include the movement of components of the device or writing more information to the display.

Processing block 314 reads from the fields in the menu descriptor if the menu on the display should change as a result of the key being struck. Based on the information contained in those fields, processing block 314 causes the desired information to appear on display 200 (FIG. 2). In that regard, processing block 314 operates similarly to processing block 306.

Having described the general operation of the controlling software, a more detailed description of one function is presented as an example.

For example, the spot film device has been operated such that it is in the state numbered st010. In that state the display 200 (FIG. 2) contains a list of names of various doctors. Display 200 (FIG. 2) also contains indications of the functions which will be performed when certain of the switches 204 (FIG. 2) are depressed.

When st010 was entered, a menu descriptor was consulted to determine which information to put on the display. The menu descriptor for the display in the state st010 is:

```
FIELD menu__names[ ] =
{
{1,2,    0,0,    0,           "* USER MENU*"   },
{2,4,    1,rw,   fmt_drname,  " 1.##########"  },
{3,4,    1,rw,   fmt_drname,  " 2.##########"  },
{4,4,    1,rw,   fmt_drname,  " 3.##########"  },
{5,4,    1,rw,   fmt_drname,  " 4.##########"  },
{6,4,    1,rw,   fmt_drname,  " 5.##########"  },
{2,20,   1,rw,   fmt_drname,  " 6.##########"  },
{3,20,   1,rw,   fmt_drname,  " 7.##########"  },
{4,20,   1,rw,   fmt_drname,  " 8.##########"  },
{5,20,   1,rw,   fmt_drname,  " 9.##########"  },
{6,20,   1,rw,   fmt_drname,  "10.##########"  },
```

-continued
```
FIELD menu__names[ ] =
{LINK,0,0,0,       0,     s(menu__key 4)   },
{MENU__END, 0,0,0, 0,     s(menu__names)   },
};
```

One familiar with the C programming language will recognize the menu descriptor as an array of structures. Those not familiar with the C programming language can find general information on the subject in the text "The C Programming Language" by Kernighan and Ritchie and published by Prentice-Hall, Inc. in 1978.

Here there are thirteen structures (rows) in the array. Each structure has six fields. The fields of the first structure have values 1, 2, 0, 0, 0, "*USER MENU*."

Each structure describes one piece of information on the display. The first two fields describe the Cartesian (row, column) position on display 200 (FIG. 2) where the piece of information will start.

The sixth field contains the characters to be displayed as part of that piece of information. The fourth field describes "attributes" of the information on the display. For example, certain values of that field cause the information to appear highlighted on the display.

The fifth field is the name of a subprogram which writes additional information on the display. That subprogram might send commands to the display to draw a picture. Alternatively, that subprogram might read variable information from certain locations in memory. No such subprogram name appears in the first structure, but a subprogram named "fmt_drname" is in the second structure. That function reads from memory the names of various doctors. The subprogram writes those names in the place on the screen where the "#" characters appear in the sixth field. (The "#" characters do not appear on the screen.)

The third field serves as a way to logically group the different structures. The operation of this index is illustrated below.

The twelfth structure in the array is of a slightly different format than the other structures. That structure has a value of "LINK" in its first field. That value does not correspond to a valid position on the display. Rather, it indicates that the sixth field in that structure contains the name of a subprogram which will read another menu descriptor and cause the information in that menu descriptor to appear on the display.

The thirteenth structure in the array is also of a different format. The first field of that structure has a value of "MENU_END" which does not correspond to a valid position on the display. Rather, it signals that the sixth field of that structure contains the starting address in memory of the menu descriptor. Such a structure is useful to identify either the beginning or end of the menu descriptor once it is stored in code memory 214 (FIG. 2).

In st010, certain of the switches 204 (FIG. 2) can be depressed to recall from non-volatile memory 210 digital words describing desired positions of the components of the spot film device or desired settings of switches on I/O Board 216 (FIG. 2). One set of digital words describing positions is stored for each of the doctors' names appearing on the screen.

When the state is first entered, the first doctor's name on the list appears highlighted. Depression of one of the switches causes the next doctor's name on the screen to be highlighted and the first doctor's name to appear unhighlighted. The highlighted doctor's name is thus selected and further operations effect only the information associated with that doctor's name.

In reference to FIG. 3, the program flow of that sequence of instructions would be as follows: The spot film device was in st010. Decision block 308 was being executed. When decision block 308 detected that a switch was pressed, processing block 310 executed. Processing block 310 accessed the state descriptor for state 10 to determine what action to take.

The state descriptor for state 10 is as follows:

```
state st010[ ] =        /* Users names state */
{
    m(k__down,      same,   c__next__name,  0),
    m(k__up,        same,   c__next__name,  1),
    m(k__add,       same    c__add,         0),
    m(k__delete     same,   c__delete,      0),
    m(k__nxt__char, same,   c__next__char,  0),
    m(k__save,      same,   c__sav__names,  0),
    m(k__ret,       1,      menu__sfd,      0),
    m(k__defaults   11,     d__default      0),
    M(dfault,       same,   p__error,       0)
};
```

This state descriptor is an array with nine entries. Each entry describes the actions to be taken when a different switch is depressed. The first entry has four fields with values of k__down, same, c__next__name, 0. The first field contains a code which will be produced by switch buffer 206 (FIG. 2) when a particular switch is depressed. Even though the name "k__down" appears in that field, the C compiler associates that name with a value before the state descriptor is loaded into code memory 214.

The second field in the entry describes the new state to which the spot film device should go when the switch described in the first field is depressed. In the first entry, the new state is a variable "same" which means the spot film device will stay in state st010. The third entry is the name of a subprogram which is invoked when the switch described in the first field is depressed. The fourth field contains parameters passed to the subprogram in the third field when it is invoked.

In this case, the switch to make the next doctor's name appear highlighted corresponds to the name "k__down." Processing block 310 thus reads from the state descriptor that the new state is "same."

Processing block 311 reads from the state descriptor the subprogram to be invoked, c__next__name in this case. Processing block 311 then calls the subprogram. That subprogram sends the appropriate commands to display driver 202 (FIG. 2) to cause the name of the second doctor to appear highlighted on display 200 (FIG. 2). The information stored for the highlighted doctor's name is stored in predetermined locations in scratch pad memory 212 (FIG. 2). Any subprogram taking an exposure will use those settings to calculate commands for motor controllers 220A through 220F and I/O Board 216 (FIG. 2) unless the information is modified by subsequent commands entered via the switches.

For this state transition a new menu is not displayed. Thus, processing block 314 does nothing and execution returns to decision block 308. It should be noted, though, that the subprogram which executes the functions of processing block 311 also performs the function of displaying a new menu in processing block 314 when a new menu is required.

A different one of the keys causes the spot film device to return to a "top level menu." That menu displays information about the other menus in the spot film device and indicates the switches to be depressed to cause the spot film device to go to a state where those menus are displayed. In the state descriptor for state 10 the switch to go to the top level menu is identified as k__ret. When the depression of that switch is detected at decision block 308, processing block 310 reads from the state descriptor associated with state st010 that the next state should be state st001.

Processing block 311 also reads from the state descriptor an indication that the transition subprogram menu__sfd should be executed. Processing block 311 invokes that subprogram. The subprogram reads from the appropriate menu descriptor.

In state st010 where a list of doctors' names appeared on display 200 (FIG. 2), other of the switches when depressed allow names of doctors to be added or subtracted to the list. Here, the third and fourth switches can be used to add a doctor's name. Depression of the fourth switch identified in the state descriptor as "k__nxt__char" causes the letter "A" to appear in the first space of the line following the last line with a doctor's name on it. Successive depressions of the fourth switch cause the successive letters of the alphabet to appear in the same position on the screen. Depression of the third switch, identified in the state descriptor as "c__add," causes the letter on the display to become a part of the doctor's name. After the third switch is depressed, depression of the fourth switch causes the letter "A" in the second space of the line. Successive depressions of the fourth switch again cause successive letters of the alphabet to appear in that position. Depression of the third switch causes the letter to be selected. In the same fashion, all the letters of the doctor's name can be added to the line.

It might be noted that the procedure for selecting letters of the alphabet using a small number of switches might be tedious. Other means for creating digital words representing letters of the alphabet might be connected to microprocessor 208 (FIG. 2). For example, a sliding switch with each position of the switch representing a letter of the alphabet might be used. Were such a sliding switch used, depression of the keys would cause the letter corresponding to the switch position to appear on the screen.

With each depression of a switch, processing block 310 reads the new state from memory. Processing block 311 reads the subprogram to execute and invokes it. The new state after the third and fourth switches are depressed is still state st010. The subprogram associated with the fourth switch computes and sends commands to display 200 via display driver 202 (FIG. 2) to cause the appropriate letters to appear in the appropriate areas of the display.

In st010, another of the switches changes the spot film device to a state where new spot film device settings can be stored in non-volatile memory 210 (FIG. 2). Those new settings, once stored, are associated with the doctor's name which was highlighted when the switch was depressed.

Here, when the switch corresponding to the value k__defaults is depressed, processing block 310 looks in the state descriptor for state st010 and determines that the new state is state st011. The subprogram d_default is invoked by processing block 311.

Processing block 314 sends commands to display 200 via display driver 202 (FIG. 2) to change the display. The new information on the display shows possible settings for the spot film devices. The information on the display is read from a different menu descriptor.

In state 11, the information on the display about spot film devices table settings indicates the number of different ways a piece of X-ray film can be segmented so that multiple X-rays can be taken on one piece of film. Depression of the various keys causes a particular segmentation to be selected and stored in memory.

As is clear from the foregoing illustration, the pattern shown in FIG. 3 is followed in every state. Thus, further illustration of the operation of the spot film device in state st011, or the other states, is not required.

Motor Controller

Figure 4:
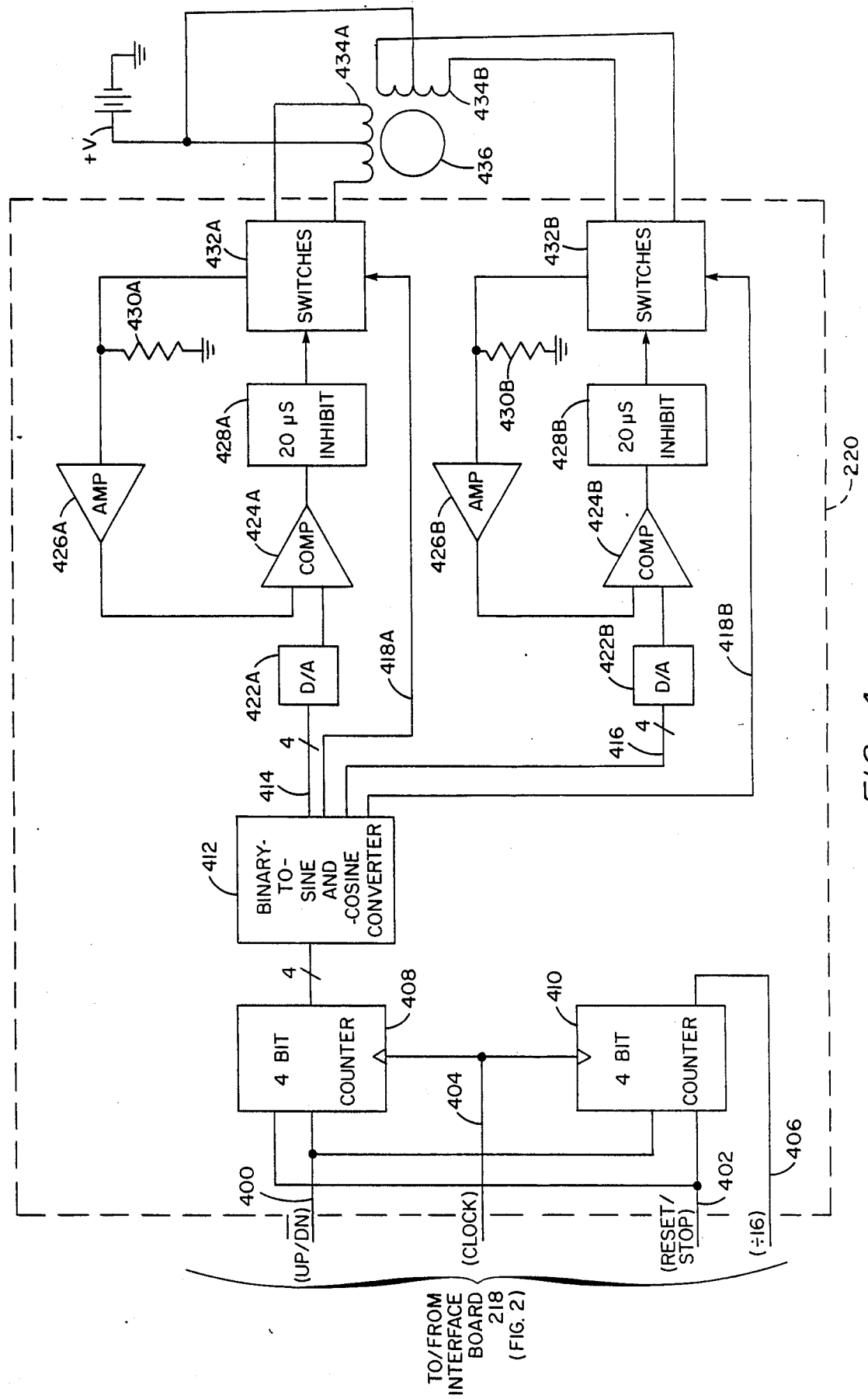
FIG. 4 is a block diagram of an exemplary one of the controllers here contemplated for the stepper motors.

FIG. 4 shows the details of a representative one of the motor controllers 220 (FIG. 2). The motor controller produces drive signals which drive field coils 434A and 434B of a motor 222 (FIG. 2). Those signals cause armature 436 of motor 222 (FIG. 2) to rotate.

The controller generates signals causing armature 436 to turn in response to control signals 400, 402 and 404, which come from microprocessor 208 via interface board 218 (FIG. 2). Each of the control signals 400, 402 and 404 is a logic level Boolean signal.

A logic low (LO) on control signal 402 causes motor controller 220 to generate the drive signals. The drive signals cause armature 436 to rotate in steps. Here, one step of the motor corresponds to a rotation of 1/200 of a revolution. In contrast, a logic high (HI) on control signal 402 inhibits motor controller 220 from producing a drive signal and armature 436 does not rotate.

Control signal 404 is a clock signal. During each pulse of the clock when control signal 402 is a logic (LO), the drive signals for field coils 434A and 434B change. For reasons to be explained more fully below, armature 436 turns one step, i.e., 1/200 revolution, for every sixteen clock pulses of control signal 404. Counter 410 counts groups of sixteen clock pulses and causes control signal 406 to become a logic HI after each group of sixteen (i.e., four motor steps). Microprocessor 208 (FIG. 2) can thus compute how far armature 436 has turned and can change signal 402 when armature 436 has rotated a desired amount.

Control signal 400 affects the direction in which armature 436 rotates at each step. When control signal 400 is a logic HI, armature 436 rotates counterclockwise. When control signal 400 is a logic LO, armature 436 rotates clockwise.

Stepper motors having two field coils are driven by drive signals 90° out-of-phase in each field coil. One skilled in the art will note that square wave drive signals are often used. However, stepper motors driven by square wave drive signals make a "snapping" noise at each step because of the abrupt change in the drive signal. As that "snapping" noise is undesirable, sinusoidal drive signals are used here.

The desired sinusoidal signals are generated by binary-to-sine converter 412. The inputs to binary-to-sine converter 412 come from four bit counter 408. When the control signals indicate the motor should be rotating, the outputs of four bit counter 408 make a four bit binary word which is incremented or decremented at each clock pulse of control signal 404. The four bit binary word is incremented when control signal 400 is UP (i.e., logic HI). The four bit binary word is decremented otherwise (i.e., when the counter decrements, the motor turns backwards). Because the counter is four bits long, the output will start at 0 and go to 15 before returning to 0.

Binary-to-sine converter 412 places a four bit digital word on output 414 for each digital word from four bit counter 408. Each word on output 414 represents the value of a sine wave at a selected point. The points are selected to be separated by 1/16 of the period of the sine wave. Thus, when the output of four bit counter 408 goes from 0 to 15, the values of output 414 trace out one cycle of a sine wave. Output 416 is similar to output 414 except the values of output 416 trace out a cosine wave (i.e., 90° out-of-phase with output 414). It should be noted in FIG. 4 that the circuitry between output 416 and field coil 434B is similar to the circuitry between output 414 and field coil 434A as described in detail herein.

The output 414 is fed to digital-to-analog converter (D/A) 422A. The analog signal produced by D/A 422A representing outputs 414 is the reference input to comparator 424A. The second input to comparator 424A represents the current flowing through field coil 434A. The signal representing the current through field coil 434A is derived from the voltage drop across resistor 430A. A center tap (not numbered) of the field coils 434A is connected to the positive side of a voltage supply, +V. The only path to the negative side of the supply is through resistor 430A. Thus, all the current flowing through the field coil 434A flows through resistor 430A, thereby making the voltage at the input of amplifier 426A proportional to the current through the field coil 434A. The output of amplifier 426A then is representative of the current flowing through field coil 434A. As can be seen in FIG. 4, the output of amplifier 426A is the input to comparator 424A.

The output of comparator 424A indicates if the actual current through field coil 434A exceeds the desired current. The output of comparator 424A is a logic LO if the actual field current exceeds the desired current. If comparator 424A indicates the actual field current is less than the desired current, switches 432A (here FET transistor switches) connect one side of field coil 434A to the negative side of the supply through resistor 430A. The current through field coil 434A then increases. If comparator 424A indicates the actual field current is greater than desired, the indication is passed to switches 432A via inhibit circuit 428A. In response, switches 432A disconnect field coil 434A from the negative side of the supply. The field current therefore decreases. Inhibit circuit 428A prevents the signal controlling switches 432A from changing for a predetermined amount of time, here twenty microseconds. When the level of field current drops below the desired field current, the output of comparator 424A changes to a logic HI. After the twenty microsecond delay, inhibit circuit 428A passes the indication that the current is too low to switches 432A and the coil is reconnected to the negative side of the supply. In the manner described above, the actual field current is regulated to be close to the desired field current. Here, resistor 430A is a very small value. Thus, most of the power out of supply +V goes to turn armature 436. The present motor controller, therefore, dissipates much less power than motor controllers conventionally used in spot film devices.

Here, field coil 434A is a center-tapped coil with the supply +V connected to the center tap. Either of the two ends of the coil could be connected to the negative side of the supply to close a circuit through the field coil. Depending on which end is connected to the negative supply, the current will effectively flow in opposite directions through different halves of the field coil. This difference is used to effectively create a negative current flow through the field coil 434A when the output of binary-to-sine converter 412 indicates the field coil should be negative. The negative field coil current is obtained by actuating a second switching element in switches 432A. Each switch connects one end of the field coil to the negative side of the supply. Output 418A of binary-to-sine converter 412 is a logic LO when the current through the coil should be negative. When output 418A is LO and comparator 424A indicates current should flow through the field coil 434A, the second switch is closed. Conversely, when output 418A is HI, the first switch is closed. Thus, output 418A controls the direction of current flow through field coil 434A.

Here, binary-to-sine converter 412 is a PAL such as part number PAL 20X10CNS from Monolithic Memories, Inc. of California. Four bit counters 408 and 410 can also be implemented using a similar PAL. By appropriately programming the PAL, both four bit counters 408 and 410 can be implemented with one chip. D/A 422A and D/A 422B are four bit discrete component digital-to-analog converters such as part number CA31-30AE from RCA of New Jersey plus a plurality of discrete resistors. Comparators 424A and 424B are part number CA3130AE from RCA of New Jersey. Inhibit circuits 428A and 428B are constructed from part number NE555 from Signetics of California. Switches 432A and 432B are constructed from part number SG3627 from Silicon General which drive transistor switches such as part number IRF640 from International Rectifier of California.

Mask

Figure 5:
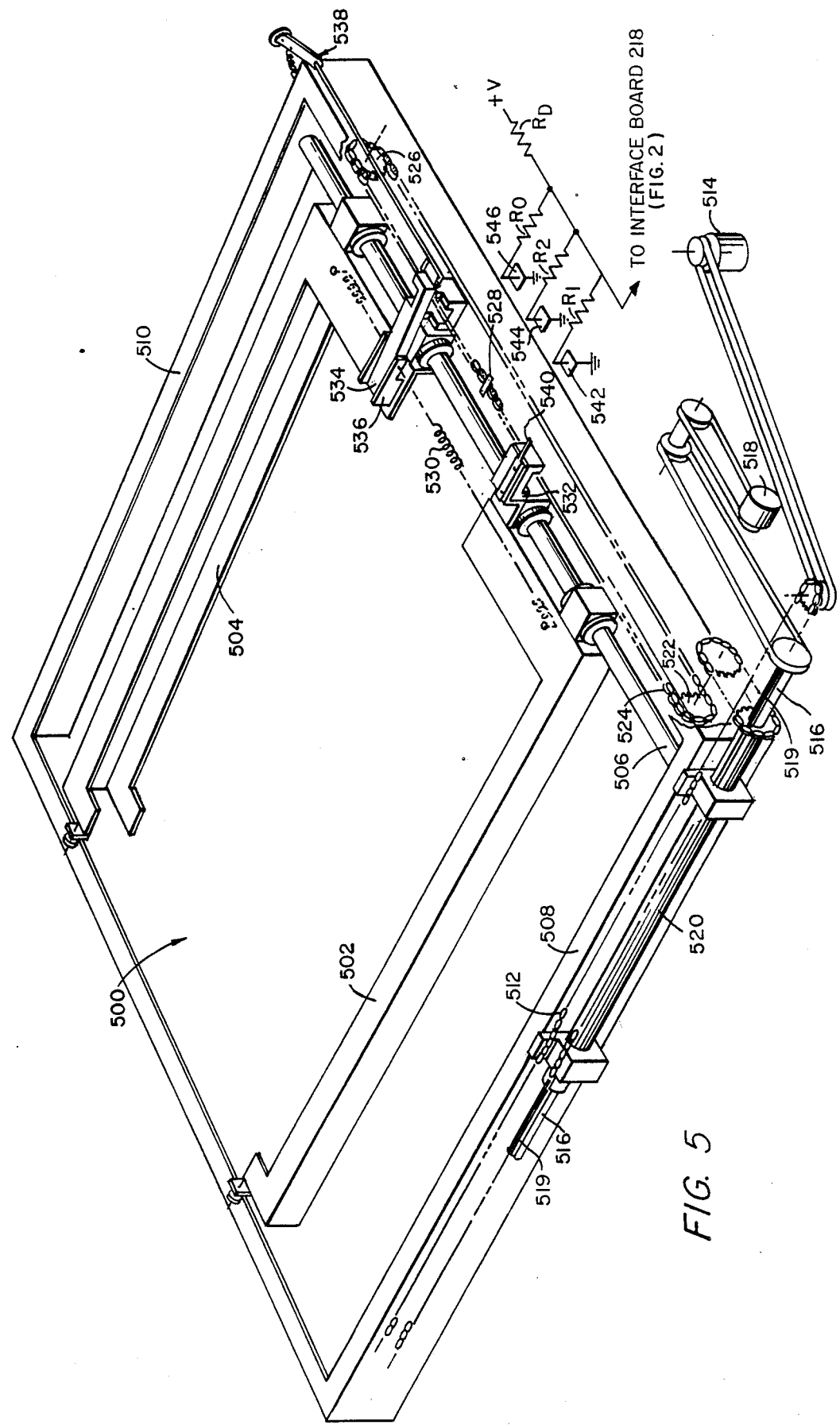
FIG. 5 is a simplified view of the film carriage here contemplated.

Referring now to FIG. 5, it may be seen that a cassette carriage 500 includes a first and a second one of a pair of holding arms 502, 504 which are shaped and positioned so as to conform substantially with a cassette (not shown). Positioning of the holding arms 502, 504 is effected by journal bearings (not numbered) on a transverse shaft 506 that in turn is affixed to elements 508, 510. The just-mentioned elements in turn are slidably mounted and driven by a longitudinal chain drive 512 that is moved by a stepping motor 514 (sometimes referred to herein as the longitudinal stepping motor). A drive shaft 516 is driven through a chain drive (not numbered) that is moved by a stepping motor 518 (sometimes referred to herein as the transverse stepping motor). The drive shaft 516 is grooved along its length to accept a spline 518 (not shown) affixed to a hollow shaft 520 and projecting inwardly therefrom. A driven sprocket 522 is rotated by a chain drive (not numbered) between the hollow shaft 520 and such sprocket. An endless chain 524 is passed around the driven sprocket 522 and an idler sprocket 526. A pawl-like member 528 is affixed to the endless chain 524 as shown. It will be observed that the endless chain 524 is substantially parallel to the transverse shaft 506 so the pawl-like member 528 may be moved in either direction substantially parallel to the transverse shaft 506. A helical spring 530 is connected between the first holding arm 502 and the second holding arm 504. An arm 532 is mounted on a journal bearing (not numbered) supporting the first holding arm 502 and shaped so as to intercept the pawl-like member 528 but to pass the endless chain 524. A latch 534, pivotably mounted on a mounting member 536 affixed to the second holding arm 504, is also shaped to accept the pawl-like member 528. A latch release assembly 538 is operative when it is desired to load (or eject) a cassette (not shown) to rotate the latch 534 away from the pawl-like member 528. It follows, then, that when the endless chain 524 is driven to move the pawl-like member 528 into contact with the arm 532, continued driving of the endless chain 524 forces the first holding arm 502 away from the second holding arm 504. In passing it will be noted that the second holding arm 504 may then be held in position in any convenient way (as by a detent mechanism, not shown). When the direction of movement of the pawl-like member 528 is reversed, i.e., the pawl-like member 528 is moved toward the latch 534, the helical spring 530 is operative to pull the first holding arm 504 in the same direction. It will be appreciated that a cassette (not numbered) will have been positioned between the first holding arm 502 and the second holding arm 504 when those arms were forced apart. It will also be appreciated that the orientation of the cassette with the grooves (not numbered) in the first holding arm 502 and the second holding arm 504 is not initially critical. That is to say, when a cassette is loaded and the first holding arm 502 is urged toward the second holding arm 504 under the influence of the helical spring 530, any misalignment of the cassette is automatically corrected. Still further, it will be appreciated that the size of the cassette to be loaded is, within wide limits, immaterial. After a cassette is loaded the elements just described are moved to the right, causing the latch release assembly 538 to be withdrawn from contact with the latch 534. A spring (not shown) then causes the latch 534 to be rotated into the position shown in FIG. 5. The pawl-like member 528 then is moved into an appropriate holding slot (not shown) in the latch 534. Consequently, then, actuation of the stepping motor 514 causes motion of the latch 534, the mounting member 536 and the second holding arm 504. Any motion of the second holding arm 504 is transmitted through a cassette (not shown) to the first holding arm 502.

A switch actuator 540 is mounted on the arm 532 to project therefrom as shown. Switches (here three switches 542, 544, 546) are mounted generally in a line parallel to the transverse shaft 506 so that the switch actuator 540 may actuate one of the switches 542, 544, 546 after a cassette has been loaded and the cassette carriage has been moved to a reference position. Each one of the switches 542, 544, 546 is arranged in an electrical circuit in such a manner that a different distinguishing electrical signal is passed, via the interface board 218 (FIG. 2), to the microprocessor 208 (FIG. 2), depending upon which one of the switches 542, 544, 546 is actuated. Thus, for example, each one of the switches 542, 544, 546 may be disposed in series with a differently valued resistor $R_0$, $R_1$, $R_2$ in voltage dividers that include a common resistor RD as shown. It will be appreciated that switch 542, when actuated, produces a signal indicating that a cassette of a first size has been loaded; switch 544, when actuated, produces a signal indicating that a cassette of a second size has been loaded; and switch 546, when actuated, produces a signal indicating that no cassette has been loaded. It will be appreciated that corresponding switches (not shown) may be mounted so as to be actuated selectively in accordance with the motion of the elements 508, 510 from a "LOAD" (or "EJECT") position to a reference position. When such corresponding switches are used along with the switches 542, 544, 546, no cassette can be skewed between the first and second holding arms 502, 504 and still actuate a corresponding pair of switches.

Figure 6:
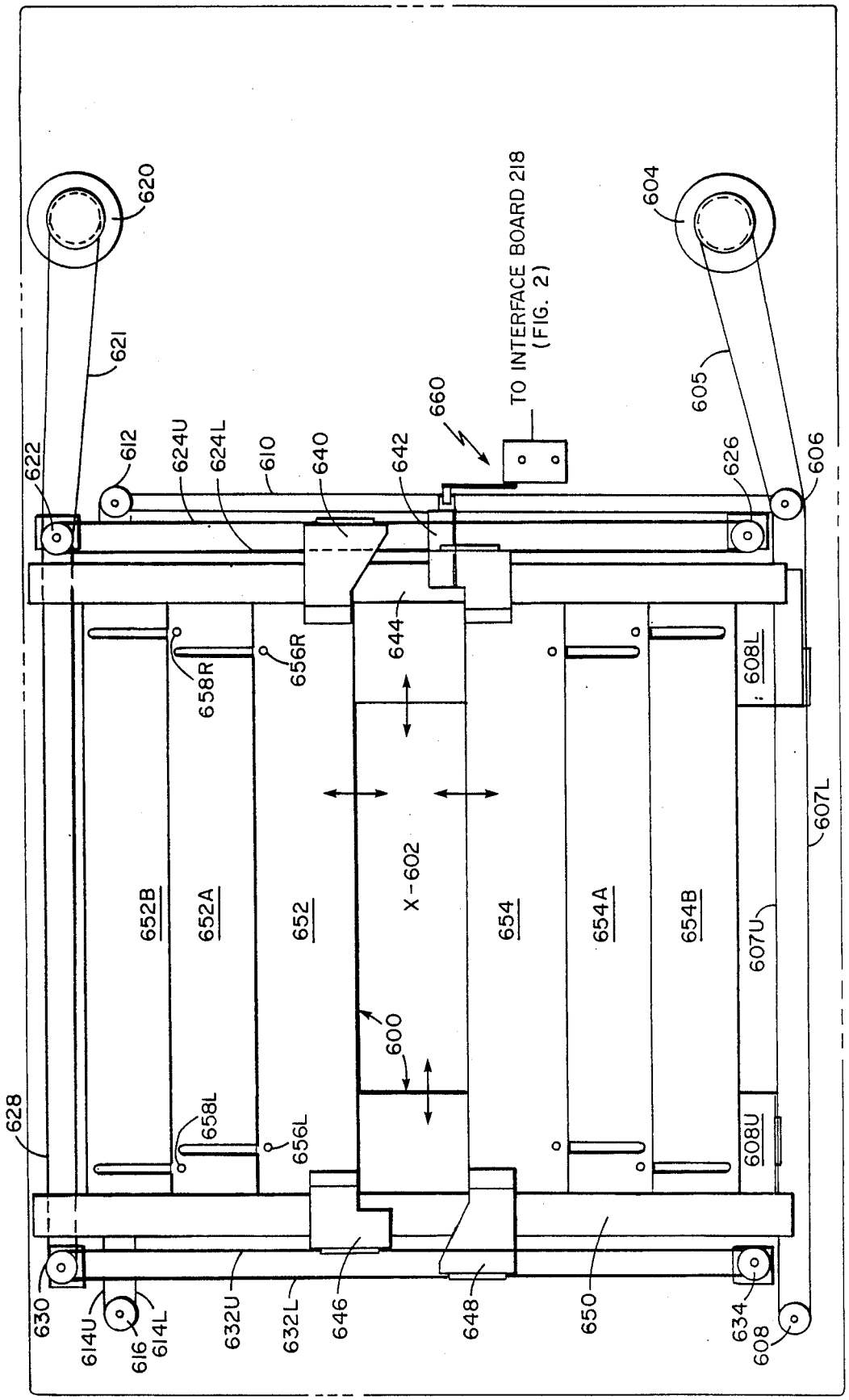
FIG. 6 is a simplified view of the adjustable mask here contemplated.

Referring now to FIG. 6 it may be seen that a mask 600 is here made up of orthogonally disposed elements (to be described) that are movable so as to change the size of an opening (not numbered) having a center X designated by the reference numeral 602. Thus, a stepper motor 604 is connected by a drive belt 605 to a first one of two pulley grooves formed on a sheave 606. A first motion transmitting belt (not numbered but having an upper run 607U and a lower run 607L) is connected between a second one of the two pulley grooves on the sheave 606 and a sheave 608 that has a single pulley groove. A mask element 608U is connected in any convenient manner to the upper run 607U and a mask element 608L is connected in any convenient manner to the lower run 607L. A transfer belt 610 is passed around the second pulley groove in the sheave 606 to the first one of two pulley grooves in a sheave 612. A second motion transmitting belt (not numbered but having an upper run 614U and a lower run 614L) is passed from the second pulley groove in the sheave 612 to a sheave 616 that has a single pulley groove. The upper run 614U is attached in any convenient manner to the mask element 608U and the lower run 614L is attached in any convenient manner to the mask element 608L. It will now be appreciated that, as the stepper motor 604 is actuated, the just-described belt drive will cause the facing edges (not numbered) of the mask elements 608U, 608L to move toward or away from each other (as indicated by the horizontal double-headed arrows), depending upon the direction in which the stepper motor 604 is rotated.

A stepper motor 620 is connected by a belt 621 to a first pulley groove in a sheave 622 that has three pulley grooves. A first motion transmitting belt (not numbered but having an upper run 624U and a lower run 624L) is passed from a second pulley groove in the sheave 622 to a sheave 626 with a single pulley groove. A transfer belt 628 is passed from the third pulley groove in the sheave 622 to a first pulley groove in a sheave 630 having two pulley grooves. A second motion transmitting belt (not numbered but having an upper run 632U and a lower run 632L) is passed from the second pulley groove of the sheave 630 to a sheave 634 having a single pulley groove.

The upper run 624U of the first motion transmitting belt is attached in any convenient manner to a connecting element 640; similarly, the lower run 624L is attached to a connecting element 642. Connecting elements 640, 642 are slidably mounted on a shaft 644. Upper run 632U is attached in any convenient manner to a connecting element 646; similarly, the lower run 632L is attached to a connecting element 648. Connecting elements 646, 648 are slidably mounted on a shaft 650. It will now be apparent that, as the stepper motor 620 is actuated, the just-described belt drives will cause the connecting elements 640, 642 to move toward or away from each other on the shaft 644 and the connecting elements 646, 648 to move in the same manner on the shaft 650.

The connecting elements 640, 646 are attached in any convenient manner to the opposite ends of a mask element 652 and the connecting elements 642, 648 are similarly attached to the ends of a mask element 654. Coupling pins 656L, 656R are press-fitted into holes (not numbered) in the mask element 652 to project into slots (not numbered) in a mask element 652A. In like fashion, coupling pins 658L, 658R are press-fitted into holes (not numbered) in the mask element 652A to project into slots (not numbered) in a mask element 652B. As is obvious in FIG. 6, mask elements 654, 654A and 654B are similarly interconnected. The mask elements 652, 654 fit into first grooves (not shown) in the shafts 644, 650; the mask elements 652A, 654A into second grooves; and mask elements 652B, 654B into third grooves. It will now be obvious that movement of the connecting elements 640, 642 and 644, 646 away from each other will ultimately cause the mask elements 652, 652A, 652B to be nested toward the top of FIG. 6 and the mask elements 654, 654A, 654B to be nested near the bottom of FIG. 6.

To complete the contemplated mask assembly, a reference indicator 660 (here a photodetector) is arranged to sense when the connecting element 642 is in a reference position (meaning that the mask elements 652, 654 are at predetermined positions) and to provide a position reference signal, via the interface board 218 (FIG. 2), for the microprocessor (FIG. 2). A second reference indicator (not shown) is provided to produce a position reference signal for the mask elements 608U, 608L.

The mask elements 608U, 608L, 652, 652A, 652B, 654, 654A, 654B (and the connecting pins 656L, 656R, 658L, 658R and the unnumbered pins in mask elements 654, 654A) are fabricated from materials that are opaque to X-rays. It will be noted that sprocket wheels could be substituted for the pulleys illustrated in FIG. 6 and just described.

Figure 7:
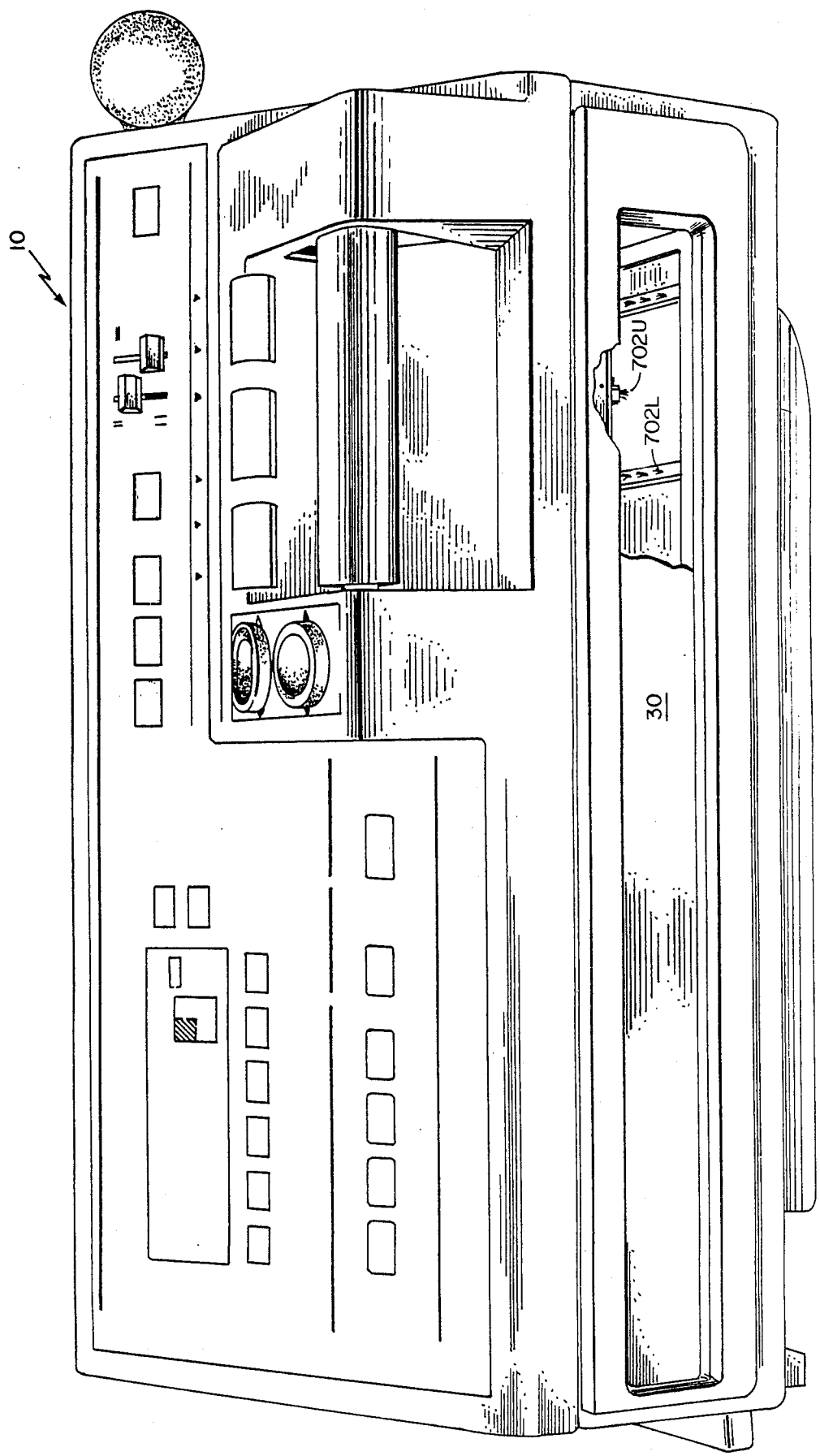
FIG. 7 is a sketch, similar to FIG. 1A, except that the cassette acccess section is partially broken away to show the contemplated structure for aligning cassettes during loading or unloading.

Referring now to FIG. 7, it may be seen that the contemplated cassette loader consists of: (a) rows of brushes 702L affixed in any convenient manner to the bottom of the cassette access slot 30 and projecting upwardly from such bottom; and (b) rows of brushes 702U affixed in any convenient manner to the top of the cassette access slot 30 and projecting downwardly from such top. The lengths of the individual fibers are selected so that: (a) the free ends of the brushes 702L are substantially co-planar; (b) the free ends of the brushes 702U are also co-planar; and there is a space between the free ends of the brushes 702L and 702U. The material of the individual bristles in the brushes 702L, 702U here is nylon. It will now be appreciated that when a cassette (not shown) is being loaded the brushes 702U, 702L are, respectively, compliant with the upper and lower surfaces of such cassette. At the same time, the brushes 702U, 702L are effective to hold the cassette being loaded in alignment with the pair of opposing holding arms 502, 504 (FIG. 5).

Having described a preferred embodiment of this invention, it will now be apparent to one of skill in the art that many changes and modifications may be made without departing from the inventive concepts. It is felt, therefore, that this invention should not be restricted to its disclosed embodiment, but rather should be limited only by the spirit and scope of the appended claims.

What is claimed is:

1. In spot film apparatus wherein a rectangular cassette containing photographic film is to be loaded and then is to be moved from a known initial position along orthogonally disposed axes, an improved carriage assembly for the cassette, such carriage assembly comprising:
  (a) a pair of opposing holding arms shaped to conform substantially with the sides of the cassette;
  (b) means for mounting each one of the pair of opposing holding arms on a shaft parallel to a first one of the orthogonal axes; and
  (c) means for selectively moving a first one of the pair of opposing holding arms along the shaft while maintaining the position of the second one of the pair of opposing holding arms or moving both of the holding arms simultaneously along the shaft, said moving means comprising,
    a continuous chain drive disposed substantially parallel to the shaft, such drive supporting a pawl-like member projecting therefrom;
    a helical spring having a first end attached to the first one of the opposing holding arms and a second end attached to the second one of the opposing holding arms; and
    means for actuating the continuous chain drive to move the pawl-like member into contact with the mounting means of the first one of the opposing holding members thereby to move, against a restoring force engendered by the helical spring, only the first one of the opposing arms.

2. An improved carriage assembly as in claim 1 comprising, additionally:
  (a) a movable latch disposed on the second holding arm, such latch having, when actuated, a portion configured to receive the pawl-like member; and
  (b) means for actuating the movable latch and the continuous chain drive to move the pawl-like member into the portion of the movable latch configured to receive the pawl-like member.

* * * * *